(12) United States Patent
Kitahara et al.

(10) Patent No.: US 10,044,508 B2
(45) Date of Patent: Aug. 7, 2018

(54) EMBEDDING DIGITAL WATERMARK AT THE RECEIVER END TO KEEP TRACK OF DIGITAL CONTENT SOURCE AND INTENDED LEGAL SUBSCRIBER

(71) Applicant: Saturn Licensing LLC, New York, NY (US)

(72) Inventors: Jun Kitahara, Saitama (JP); Kazutoyo Sekine, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/385,306

(22) PCT Filed: Feb. 18, 2013

(86) PCT No.: PCT/JP2013/053853
§ 371 (c)(1),
(2) Date: Sep. 15, 2014

(87) PCT Pub. No.: WO2013/140908
PCT Pub. Date: Sep. 26, 2013

(65) Prior Publication Data
US 2015/0078551 A1    Mar. 19, 2015

(30) Foreign Application Priority Data

Mar. 22, 2012  (JP) ................ 2012-066375

(51) Int. Cl.
*H04L 9/32* (2006.01)
*H04N 21/8358* (2011.01)
(Continued)

(52) U.S. Cl.
CPC ........... *H04L 9/3247* (2013.01); *G06F 21/16* (2013.01); *H04N 19/467* (2014.11);
(Continued)

(58) Field of Classification Search
CPC ........... G06F 21/10–21/16; H04L 9/00; H04L 9/3247; H04L 2209/608; H04N 7/167;
(Continued)

(56) References Cited

U.S. PATENT DOCUMENTS 8,627,482 B2    1/2014  Bloom et al.
2002/0059580 A1  5/2002  Kalker et al.
(Continued)

FOREIGN PATENT DOCUMENTS

CN    1556969 A    12/2004
CN    1689098 A    10/2005
(Continued)

OTHER PUBLICATIONS

Extended European Search Report for EP Application No. 13764530.5, dated Aug. 5, 2015.
(Continued)

*Primary Examiner* — Ashok Patel
*Assistant Examiner* — Quazi Farooqui
(74) *Attorney, Agent, or Firm* — Lerner, David, Littenberg, Krumholz & Mentlik, LLP

(57) ABSTRACT

There is provided a reception device including a content reception unit configured to receive content, a digital watermark information acquisition unit configured to acquire information specifying an outflow route for the content to create a digital watermark, and a content output unit configured to embed a digital watermark in the received content by using the acquired information and configured to output the content.

20 Claims, 14 Drawing Sheets

(51) Int. Cl.

| | | |
|---|---|---|
| *H04N 21/418* | (2011.01) | |
| *H04N 21/8355* | (2011.01) | |
| *H04N 21/4385* | (2011.01) | |
| *H04N 19/467* | (2014.01) | |
| *H04N 19/503* | (2014.01) | |
| *H04N 21/2347* | (2011.01) | |
| *H04N 21/235* | (2011.01) | |
| *H04N 21/254* | (2011.01) | |
| *H04N 21/4627* | (2011.01) | |
| *G06F 21/16* | (2013.01) | |

(52) U.S. Cl.
CPC ....... *H04N 19/503* (2014.11); *H04N 21/2347* (2013.01); *H04N 21/2351* (2013.01); *H04N 21/2541* (2013.01); *H04N 21/4181* (2013.01); *H04N 21/43853* (2013.01); *H04N 21/4627* (2013.01); *H04N 21/8355* (2013.01); *H04N 21/8358* (2013.01); *H04L 2209/608* (2013.01)

(58) Field of Classification Search
CPC ........... H04N 21/4627; H04N 21/2541; H04N 19/467; H04N 19/503; H04N 21/2351; H04N 21/2347; H04N 21/43853; H04N 21/8358; H04N 21/8355; H04N 21/4181
USPC .......................... 380/211; 713/160, 176, 180
See application file for complete search history.

(56) References Cited

U.S. PATENT DOCUMENTS

| | | | |
|---|---|---|---|
| 2002/0067914 A1 | 6/2002 | Schumann et al. | |
| 2002/0076083 A1* | 6/2002 | Levy .................... | G06T 1/0028 382/100 |
| 2004/0161108 A1 | 8/2004 | Ando et al. | |
| 2005/0010779 A1 | 1/2005 | Kobayashi et al. | |
| 2005/0081042 A1* | 4/2005 | Venkatesan ............ | G06F 21/10 713/176 |
| 2006/0075424 A1 | 4/2006 | Talstra et al. | |
| 2006/0133477 A1 | 6/2006 | Zhang et al. | |
| 2006/0156003 A1 | 7/2006 | Zhang et al. | |
| 2007/0165851 A1 | 7/2007 | Roberts | |
| 2009/0290711 A1* | 11/2009 | Bloom ................... | H04N 7/163 380/239 |
| 2009/0319639 A1* | 12/2009 | Gao ........................ | G06F 21/10 709/219 |
| 2010/0070991 A1 | 3/2010 | Kaag et al. | |
| 2011/0261998 A1 | 10/2011 | Roberts et al. | |

FOREIGN PATENT DOCUMENTS

| | | |
|---|---|---|
| CN | 101491078 A | 7/2009 |
| JP | 11-341450 A | 12/1999 |
| JP | 2001305957 A | 11/2001 |
| JP | 2002-084510 A | 3/2002 |
| JP | 2006-186952 A | 7/2006 |
| JP | 2007-202054 A | 8/2007 |
| JP | 2008-048163 A | 2/2008 |
| RU | 2324301 C2 | 5/2008 |
| RU | 2367018 C2 | 9/2009 |
| RU | 2408150 C2 | 12/2010 |
| WO | 9953689 A1 | 10/1999 |
| WO | 2008-013562 A1 | 1/2008 |
| WO | 2008048356 A2 | 4/2008 |

OTHER PUBLICATIONS

Commercial requirements for delivery of watermarked AV content using CIPlus.
Chinese Office Action for Application No. 201380014415.8 dated Aug. 2, 2016.
Japanese Office Action for Application No. 2014-506080 dated Aug. 30, 2016.
Russian Office Action for Application No. 2014137295 dated Jan. 20, 2017.
Chinese Office Action for Application No. 201380014415.8 dated Feb. 12, 2018.
International Search Report in International Publication PCT/JP2013/053853 dated May 7, 2013.

* cited by examiner

EMBEDDING DIGITAL WATERMARK AT THE RECEIVER END TO KEEP TRACK OF DIGITAL CONTENT SOURCE AND INTENDED LEGAL SUBSCRIBER

CROSS-REFERENCE TO RELATED APPLICATION

The present application is a national phase entry under 35 U.S.C. § 371 of International Application No. PCT/JP2013/053853 filed Feb. 18, 2013, published on Sep. 26, 2013 as WO 2013/140908 A1, which claims priority from Japanese Patent Application No. JP 2012-066375, filed in the Japanese Patent Office on Mar. 22, 2012.

TECHNICAL FIELD

The present technology relates to a reception device, a reception method, a program, a decryption processing device, a reception processing system, and an information processing device. More specifically, the present technology relates to a reception device and the like for receiving content from a digital broadcast system or a distribution server on a network, and the like.

BACKGROUND ART

A next generation standard of the common interface plus (CI+) in digital video broadcasting (DVB), which is being operated mainly in Europe, is now under review. The conventional CI+ is used to prevent illicit outflow of broadcast content by performing mutual authentication and protection of a communication channel between a host (mainly a TV set) and a conditional access module (CAM). Development of a standard for the next generation CI+ is under way, and communication system content is also reviewed as a scope of protection targets. Generally, the communication system content is protected by the digital rights management (DRM) technology.

The DRM technology can protect a communication channel between a server and a client against illicit behavior such as eavesdropping (wiretapping) or falsification of content. On the one hand, since content outputted from a receiver cannot be protected by the DRM, a digital watermark technology is generally used as means of detecting unauthorized copying or falsification of content after the content is outputted (see, for example, Patent literature 1 below).

CITATION LIST

Patent Literature

Patent Literature 1: JP 2002-084510A

SUMMARY OF INVENTION

Technical Problem

Content mentioned herein which should be protected against unauthorized use includes two kinds: broadcast content and communication content. In a conventional technology, for both contents, a communication channel from a distribution source (broadcast equipment, a content server) to a receiver (TV set) can be protected by the conditional access system (CAS)/DRM technology. On the one hand, since there is no protection capability after content is outputted from a receiver, it was difficult to stop outflow of an unauthorized copy once a copy is made by illicit means such as shooting TV screen with a video camera or bypassing a content protection technology.

In the conventional technology, as a method for inserting a digital watermark in content, a method is possible in which a transmitting side embeds a sender-unique ID and a receiver side embeds a receiver-unique ID. In a broadcast service multicasting to many unspecified receivers, since it is impossible to specify a single receiver at a distribution destination, the transmitting side cannot embed a receiver ID.

In addition, it is also difficult for the receiver side to determine a sender-unique ID in an integrated manner. That is, it is possible that the transmitting side and the receiver side respectively insert a digital watermark doubly. However, such adverse effects as difficulty in standardization to an identical digital watermark technology among all of multiple broadcast stations and communication providers, deterioration in the picture quality or the sound quality due to superimposition of a digital watermark, and the like are expected.

An object of the present technology is to make it possible to satisfactorily specify an outflow route for content.

Solution to Problem

According to a concept of the present technology, there is provided a reception device including a content reception unit configured to receive content, a digital watermark information acquisition unit configured to acquire information specifying an outflow route for the content to create a digital watermark, and a content output unit configured to embed a digital watermark in the received content by using the acquired information and configured to output the content.

In the present technology, the content reception unit receives content. In this case, for example, content is received from a digital broadcast system and/or a distribution server on a network. The digital watermark information acquisition unit acquires information specifying an outflow route for content to create a digital watermark. This information includes at least information identifying a transmission source of the content and information identifying an own device. Then, using information to create a digital watermark, the content output unit embeds a digital watermark in the received content and outputs the content.

As such, in the present technology, a digital watermark is embedded in content to be outputted, by use of information specifying an outflow route for that content, and it becomes possible to specify the outflow route if the content is used in an unauthorized manner. In addition, the effect of deterrence which obviates illicit outflow of content can also be expected.

In addition, in the present technology, for example, when information which should be used to create a digital watermark is added to the received content, the digital watermark information acquisition unit may be configured to further acquire this information. In this case, it becomes possible to use useful information to specify an outflow route of content added at a transmission source of the content, to embed a digital watermark in this content and output the content.

According to a concept of the present technology, there is provided a reception device including a content reception unit configured to receive encrypted content, an interface unit configured to transmit the received content to external equipment and configured to receive decrypted content from the external equipment, and a content output unit configured to embed, by using information specifying an outflow route for the content to create a digital watermark, a digital watermark in the content received from the external equipment and configured to output the content.

In the present technology, the content reception unit receives encrypted content. The interface unit transmits the received content to the external equipment and receives decrypted content from the external equipment. Then, the content output unit embeds a digital watermark in the content received from the external equipment and outputs the content. In this case, information specifying an outflow route for content to create a digital watermark is used. In this case, for example, information to create a digital watermark which is added to the content received from the external equipment is used. For example, the information to create a digital watermark includes at least information identifying a transmission source of the content, information identifying an own device, and information identifying the external equipment.

As such, in the present technology, a digital watermark is embedded in content to be outputted, by use of information specifying an outflow route for that content, and it becomes possible to specify the outflow route if the content is used in an unauthorized manner. In addition, the effect of deterrence which obviates illicit outflow of content can also be expected.

In addition, in the present disclosure, for example, when the content output unit determines that a digital watermark has already been embedded in content received from external equipment, the content output unit may be configured not to embed a digital watermark in the content received from the external equipment. In this case, the interface unit further receives functional information of the external equipment from the external equipment, and the content output unit may be configured to determine based on the received functional information whether or not a digital watermark has been embedded in the content received from the external equipment. In this case, it is possible to avoid deterioration in the picture quality or the sound quality due to superimposition of digital watermarks.

According to a concept of the present technology, there is provided a decryption processing device including an interface unit configured to receive encrypted content from external equipment and configured to transmit decrypted content to the external equipment, a decryption unit configured to perform a decryption processing on the encrypted content to acquire the decrypted content, and a digital watermark embedment unit configured to embed a digital watermark in the content to be transmitted by using information specifying an outflow route for the content to create a digital watermark.

In the present technology, the interface unit receives encrypted content from external equipment and transmits decrypted content to this external equipment. The decryption unit performs a decryption processing on the encrypted content to acquire the decrypted content. Then, the digital watermark embedment unit uses information specifying an outflow route for content to create a digital watermark, to embed a digital watermark in the content to be transmitted. For example, the information to create a digital watermark includes at least information identifying a transmission source of the content, information identifying the external equipment, and information identifying an own device.

As such, in the present technology, it becomes possible to transmit to external equipment content in which a digital watermark is embedded by use of information specifying an outflow route. Therefore, when content in which a digital watermark is embedded by use of information specifying an outflow route is outputted from external equipment, the external equipment does not have to actually perform a processing to embed a digital watermark in the content, which thus alleviates processing load.

In addition, in the present technology, for example, content includes video data for each inter-frame predictive encoded frame, and the digital watermark embedment unit may be configured to embed a digital watermark in intra-frame video data. In this case, it becomes possible to alleviate processing load for embedding a digital watermark.

According to a concept of the present technology, there is provided a decryption processing device including an interface unit configured to receive encrypted content from external equipment and configured to transmit decrypted content to the external equipment, a decryption unit configured to perform a decryption processing on the encrypted content to acquire the decrypted content, and a digital watermark information addition unit configured to add, to the content to be transmitted, information specifying an outflow route for the content to create a digital watermark.

In the present technology, the interface unit receives encrypted content from external equipment and transmits decrypted content to this external equipment. The decryption unit performs a decryption processing on the encrypted content to acquire the decrypted content. Then, the information addition unit adds information specifying an outflow route for this content to create a digital watermark, to content to be transmitted. For example, the information to create a digital watermark includes at least information identifying a transmission source of the content, information identifying the external equipment, and information identifying oven device.

As such, in the present technology, it becomes possible to transmit to external equipment content to which information specifying an outflow route to create a digital watermark is added. Therefore, when content in which a digital watermark is embedded by use of information specifying an outflow route is outputted by external equipment, this external equipment can easily acquire the information specifying the outflow route, which thus alleviates processing load.

According to a concept of the present technology, there is provided a reception processing system including a reception device and a decryption processing device. The reception device includes a content reception unit configured to receive encrypted content, an interface unit configured to transmit the received content to the decryption processing device and configured to receive decrypted content from the decryption processing device, and a content output unit configured to embed a digital watermark in the content received from the decryption processing device and output the content by using information specifying an outflow route for the content to create a digital watermark which is added to the content. The decryption processing device includes an interface unit configured to receive the encrypted content from the reception device and configured to transmit the decrypted content to the reception device, a decryption unit configured to perform a decryption processing on the encrypted content to acquire the decrypted content, and a digital watermark information addition unit configured to add the information to create the digital watermark to the content to be transmitted.

According to a concept of the present technology, there is provided a reception processing system including a reception device, and a decryption processing device. The reception device includes a content reception unit configured to receive encrypted content, an interface unit configured to transmit the received content to the decryption processing device and configured to receive decrypted content from the decryption processing device, and a content output unit configured to output the received content. The decryption processing device includes an interface unit configured to receive the encrypted content from the reception device and transmit the decrypted content to the reception device, a decryption unit configured to perform a decryption processing on the encrypted content to acquire the decrypted content, and a digital watermark embedment unit configured to embed a digital watermark in the content to be transmitted, by using information specifying an outflow route for the content to create a digital watermark.

According to a concept of the present technology, there is provided an information processing device including a content acquisition unit configured to acquire content, a digital watermark information acquisition unit configured to acquire information specifying an outflow route for the content to create a digital watermark, and a content output unit configured to embed a digital watermark in the acquired content and output the content, by using the acquired information.

In the present technology, the content acquisition unit receives content. The digital watermark information acquisition unit acquires information specifying an outflow route for content to create a digital watermark. Then, the content output unit uses the information to create a digital watermark to embed a digital watermark in the acquired content. As such, in the present technology, a digital watermark is embedded in content to be outputted by use of information specifying an outflow route for that content, and it becomes possible to specify the outflow route when the content is used in an unauthorized manner. In addition, the effect of deterrence to obviate illicit outflow of content can also be expected.

Advantageous Effects of Invention

According to the present technology, it is possible to satisfactorily specify an outflow route for content.

DESCRIPTION OF EMBODIMENTS

Figure 1:
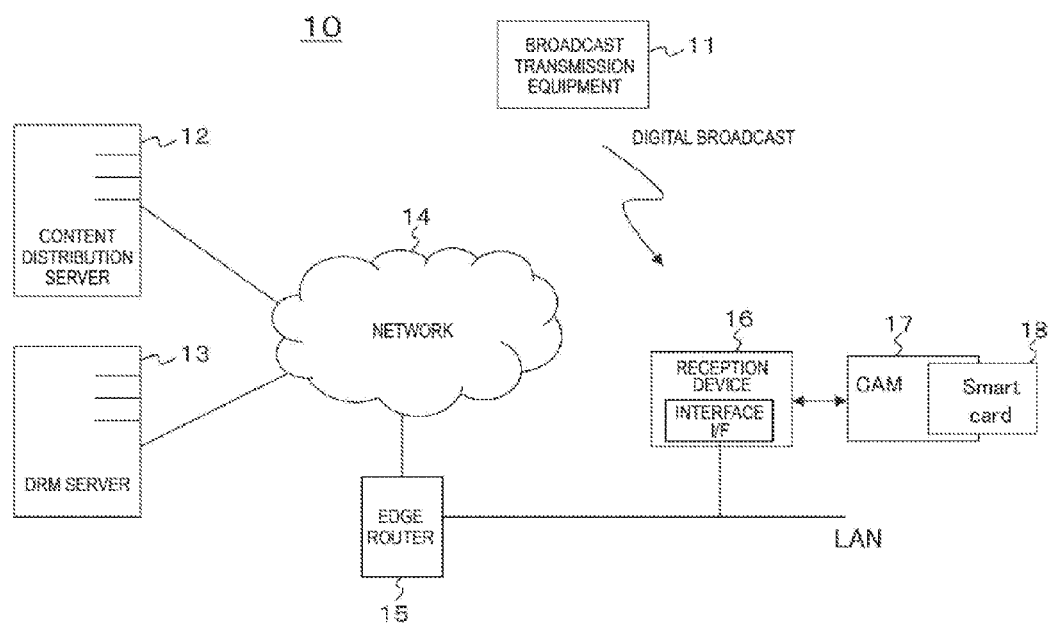
FIG. 1 is a block diagram showing a configuration example of a content transmission and reception system as an embodiment.

Hereinafter, embodiments for carrying out the present invention (hereinafter referred to as "embodiments") will be described. Note that a description will be given in the following order:
1. First embodiment
2. Modifications 1. Embodiment Configuration Example of a Content Transmission and Reception System FIG. 1 shows a configuration example of a content transmission and reception system 10 as an embodiment. The content transmission and reception system 10 has broadcast transmission equipment 11, and a content distribution server 12 and a digital rights management (DRM) server 13 which are connected to a network (communication network) 14. The content transmission and reception system 10 also has a reception device 16 connected to a customer premise network system (LAN by way of an edge router 15, and a conditional access module (CAM) module 17 and a smart card 18 which are connected to this reception device 16.

The broadcast transmission equipment 11 transmits so-called broadcast streams such as audio/visual (A/V) content and data broadcast and the like as broadcast wave, by digital terrestrial broadcasting or broadcast satellite (BS)/communications satellite (CS) broadcasting. A/V content is encrypted by a conditional access system (CAS) system of the broadcast transmission equipment to prevent unauthorized use in a communication channel between the broadcast transmission broadcast 11 and the CAM module 17 of the reception device 16. However, protection by the CAS is not necessarily required.

The content distribution server 12 is positioned on a network 14 such as an Internet or a content delivery network (CDN). Similar to the broadcast transmission equipment 11 described above, A/V content or related data and the like are placed and content is delivered to the reception device 16 connected by way of the network 14. A/V content is protected by the digital rights management (DRM) technology. However, protection by DRM is not necessarily required.

Similar to the content distribution server 12, the DRM server 13 is positioned on the network 14 such as the Internet or the CDN. The DRM server 13 delivers related data such as a decryption key for decrypting content, use conditions and the like to the reception device 16 connected by way of the network 14.

As the reception device 16, for example, a television receiver (TV set) or a set top box (STB) and the like are possible. This reception device 16 has a function to receive A/V content from broadcasting or communications and present the A/V content to users. The reception device 16 also has a function to present data broadcast application and the like to be superimposed on A/V content.

Detailed Configuration Example of a Reception Device and a CAM Module

Figure 2:
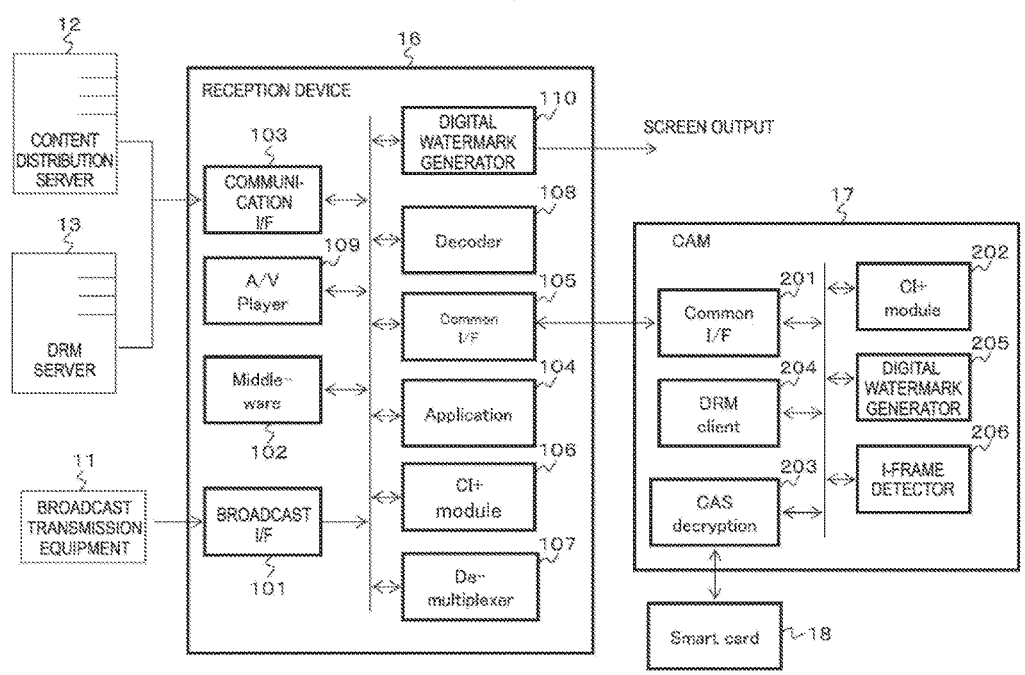
FIG. 2 is a block diagram showing a configuration example of a reception device and a CAM module.

FIG. 2 shows a detailed configuration example of a reception device 16 and a CAM module 17. The reception device 16 has a broadcast interface (broadcast I/F) 101, middleware (Middle-ware) 102, and a communication interface (communication I/F) 103.

The reception device 16 also has application (Application) 104, a common interface (Common I/F) 105, and a CI+ module (CI+ module) 106. Furthermore, the reception device 16 has a demultiplexer (De-multiplexer) 107, a decoder (Decoder) 108, an A/V player (A/V players) 109, and a digital watermark generator 110.

The broadcast interface 101 acquires a broadcast signal to be transmitted from the broadcast transmission equipment 11. The middleware 102 analyzes the broadcast signal acquired by the broadcast interface 101, performs a processing such as a channel selection processing and the like, and obtains desired content (AV streams). The communication interface 103 communicates with the content distribution server 12 by way of the network 14 to acquire content. The communication interface 103 also communicates with the DRM server 13 by way of the network 14 to obtain a DRM key.

The application 104 is software for controlling functions of the reception device 16. This application 104 displays an icon on a display screen, enabling a variety of settings and selections. The common interface 105 communicates (transmits and receives) content and a control signal with the CAM module 17. The CI+ module 106 performs mutual authentication with the CAM module 17 to protect a communication channel.

The demultiplexer 107 extracts encrypted streams such as video, audio, subtitles and the like from broadcast content after being decrypted by the CAM module 17. The decoder 108 performs a decode processing on the encrypted streams which have been extracted by the demultiplexer 107, such as video, audio, subtitles and the like, to obtain video data, audio data, subtitles data and the like. The A/V player 109 extracts encrypted streams such as video, audio, subtitles and the like from communication content after being decrypted by the CAM module 17, and further performs the decode processing to obtain video data, audio data, subtitles data and the like.

The digital watermark generator 110 embeds a digital watermark in data after being decoded, such as video data, and outputs the data. The digital watermark generator 110 uses information to create a digital watermark and embeds a digital watermark. This information is considered information which is helpful in specifying an outflow route for content. The information includes, for example, information identifying a transmission source of content, information identifying an own device, information identifying the CAM module 17, current time (decode time of content), other information related to rendering of content and the like.

As the information identifying a transmission source of content, for example, "Network ID", "Transport stream ID", or "Service ID" is used for broadcast content, and "content server ID", for example, is used for communication content. In addition, "Host ID" is used as the information identifying an own device, and "CICAM ID" is used as the information identifying the CAM module 17.

When a digital watermark has already been embedded by the CAM module 17, the digital watermark generator 110 directly outputs data after being decoded without performing a processing of embedding a digital watermark in the decoded data. In this case, any deterioration in the picture quality or the sound quality due to superimposition of digital watermarks can be avoided. The digital watermark generator 110 can determine based on functional information to be acquired from the CAM module 17, for example, whether or not a digital watermark is embedded in data after being decoded.

When the reception device 16 and the CAM module 17 perform mutual authentication with CI+, the reception device 16 and the CAM module 17 exchange a public key certificate of each other and perform an authentication processing. Although a detailed description is omitted, a format of this public key certificate is provided in the request for comments (RFC) 3280. An extension descriptor can be defined for a public key certificate. Here, for example, the following descriptor is newly defined. Exchanging this descriptor on the CI+ protocol, the reception device 16 and the CAM module 17 can learn mutual digital watermark functions and whether or not there is a digital watermark.

| Watermark Capability ::= SEQUENCE { |
| capability INTEGER |
| } |

TABLE 1

| Value | Definition |
|---|---|
| 0 | No digital watermark function |
| 1 | A digital watermark embedded (I-frame) |
| 2 | A digital watermark information embedded (SEI) |
| 3 | A digital watermark information embedded (Adaptation field of MPEG2TS) |
| 4 or more | Reserved |

When "capability=0", it shows "there is no digital watermark function". In addition, when "capability=1", it shows "a digital watermark is embedded in an I-frame (intra-frame)". In addition, when "capability=2", it shows "digital watermark information is embedded in supplement enhancement information (SEI)". Furthermore, when "capability=3", it shows "digital watermark information is embedded in an "adaptation field of MPEG2TS". Here, the digital watermark information means the above-mentioned information to create a digital watermark.

When information to create a digital watermark is added to content after being decrypted which is transmitted from the CAM module 17, for example, the digital watermark generator 110 can use that information. The digital watermark generator 110 can learn based on functional information to be acquired from the CAM module 17, for example, whether or not the information to create a digital watermark is added to the content after being decrypted (See Table 1).

A method for retrieving from content information to create a digital watermark and handing the information to the digital watermark generator 110 differs depending on a location where the digital watermark information is embedded (positioned). For example, if an encoding scheme is H.264/AVC (ISO/IEC 14496-10) and the information is embedded in an SEI field, the information is extracted by the demultiplexer 107. However, if an embedded location is another field, it is possible that a different module will process. This is by way of example, however, and a module which actually processes differs depending on implementation.

In addition, the digital watermark generator 110 can independently acquire and use information to create a digital watermark. In this case, it is also possible that information which should be used to create a digital watermark (information which is useful to specify an outflow route for content) is added in advance to broadcast content or communication content by a transmitting side (service side). In this case, for example, if the encoding scheme is H264/AVC, a method for arranging by the transmitting side data to be determined by a servicer in the SEI field, and the like are possible. In such a case, the digital watermark generator 110 further acquires and uses that information as information to create a digital watermark. In this case, it becomes possible to use useful information for specifying an outflow route for content which has been added at a transmission source of the content and embed a digital watermark.

As described above, the information to create a digital watermark (digital watermark information) is added to the SEI field if the encoding scheme is H264/AVC. In this case, for example, the reserved SEI message "reserved_sei_message" shown below can be used. However, it is also possible to define a new SEI message and add digital watermark information.

```
reserved_sei_message (payloadSize) {
    for(i=0; i <payloadSize; i++)
        reserved_sei_message payload_byte      b(8)
}
```

In addition, the CAM module 17 also has a common interface (Common I/F) 201, a CI+ module (CI+module) 202, a CAS decryption (CAS decryption) 203, and a DRM client (DRM client) 204. The CAM module 17 also has a digital watermark generator 205 and an I-frame (I-Frame) detector 206.

The common interface 201 communicates (transmits and receives) content and a control signal with the reception device 16. The CI+ module 202 performs mutual authentication with the reception device 16 to protect a communication channel. The CAS description 203 decrypts encrypted content (broadcast content) to be transmitted from the reception device 16 using a smart card 18 in which viewing subscriber information, a contract period and the like are stored. The DRM client 204 decrypts encrypted content (communication content) to be transmitted from the reception device 16.

The digital watermark generator 205 embeds a digital watermark in decrypted content. Here, content is, for example, video data for each inter-frame predictive encoded frame, and the I-frame detector 206 detects an I-frame (intra-frame). The digital watermark generator 205 embeds a digital watermark only in the I-frame detected by the I-frame detector 206. In this case, the digital watermark generator 205 extracts only an I-frame from decrypted content and performs a decode processing to embed digital watermark information in that I-frame and then to re-encode the I-frame.

In this manner, only an I-frame is decoded because load of processing whereby the CAM module 17 decodes all frames and further encodes the frames is heavy. That is to say, it becomes possible to alleviate processing load for embedding a digital watermark by selectively embedding a digital watermark only in an I-frame. However, all frames may be decoded and encoded if the CAM module 17 has high performance and is capable of embedding a digital watermark in all frames.

Similar to the digital watermark generator 110 in the above-mentioned reception device 16, the digital watermark generator 205 uses information to create a digital watermark to embed a digital watermark. The digital watermark generator 205 acquires and uses the information to create a digital watermark. Here, the information to create a digital watermark is information which is helpful in specifying an outflow route for content and includes, for example, information identifying a transmission source of the content, information identifying the reception device 16, information identifying an own device, current time (decode time of content), other information related to rendering of content and the like.

In addition, it is also possible that information (information useful to specify an outflow route for content) which should be used to create a digital watermark is added in advance to broadcast content or communication content by a transmitting side (service side). In such a case, the digital watermark generator 205 further acquires and uses that information as information to create a digital watermark. In this case, it becomes possible to use useful information for specifying an outflow route for content which has been added at a transmission source of the content and embed a digital watermark.

The CAM module 17 shown in FIG. 2 has a function to embed a digital watermark. In this case, if the reception device 16 outputs content in which a digital watermark is embedded by use of information specifying an outflow route, the reception device 16 does not have to actually perform a processing to embed a digital watermark in the content, which thus alleviates processing load.

Figure 3:
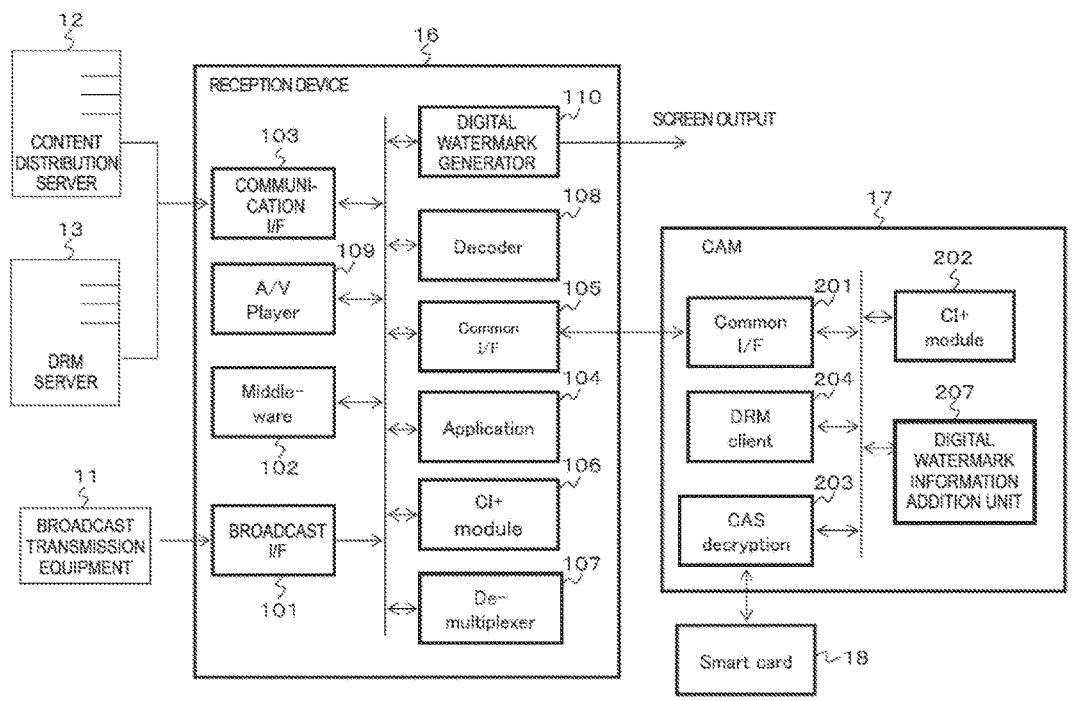
FIG. 3 is a block diagram showing a configuration example of a reception device and a CAM module.

Here, an example is also possible in which only information to create a digital watermark (digital watermark information) is embedded in decrypted content, and a digital watermark is not embedded. FIG. 3 shows a detailed configuration example of a reception device 16 and a CAM module 17 in that case. In this FIG. 3, same symbols are assigned to parts corresponding to FIG. 2, a detailed description of which is omitted.

The reception device 16 is configured similar to the reception device 16 in FIG. 2 described above. In addition, the CAM module 17 has a common interface (Common I/F) 201, a CI+ module (CI+module) 202, a CAS decryption (CAS decryption) 203, a DRM client (DRM client) 204, and a digital watermark information addition unit 207.

The digital watermark information addition unit 207 adds information to create a digital watermark (digital watermark information) to decrypted content.

The digital watermark information addition unit 207 acquires and uses information to create a digital watermark. Here, the information to create a digital watermark is information which is helpful in specifying an outflow route for content and includes, for example, information identifying a transmission source of the content, information identifying the reception device 16, information identifying an own device, current time (decode time of content), other information related to rendering of content and the like. As described above, the digital watermark information addition unit 207 embeds digital watermark information in, for example, an SEI field or an adaptation field of MPEG2TS and the like.

In addition, it is also possible that information which should be used to create a digital watermark (information useful to specify an outflow route for content) is added in advance to broadcast content or communication content by a transmitting side (service side). In such a case, the digital watermark information addition unit 207 further acquires and uses that information as information to create a digital watermark. In this case, it becomes possible to further add the information useful to specify an outflow route for content which has been added at the transmission source of content, as information to create a digital watermark.

As information to identify a transmission source of content, for example, "Network ID" "Transport stream ID", and "Service ID" are used for broadcast content, and "content server ID", for example, is used for communication content. In addition, "Host ID" is used as information to identify the reception device 16, and "CICAM ID" is used as information to identify an own device. Although a detailed description of other components of the CAM module 13 as shown in FIG. 3 is omitted, the components are configured similar to the CAM module 17 as shown in FIG. 2.

The CAM module 17 as shown in FIG. 3 can transmit to the reception device 16 content to which information specifying an outflow route to create a digital watermark is added. Thus, when the reception device 16 outputs content in which a digital watermark is embedded by use of the information specifying an outflow route, the reception device 16 can easily acquire the information specifying an outflow route, which thus alleviates processing load.

Operation Example of a Content Transmission and Reception System

Operation Example 1

Figure 4:
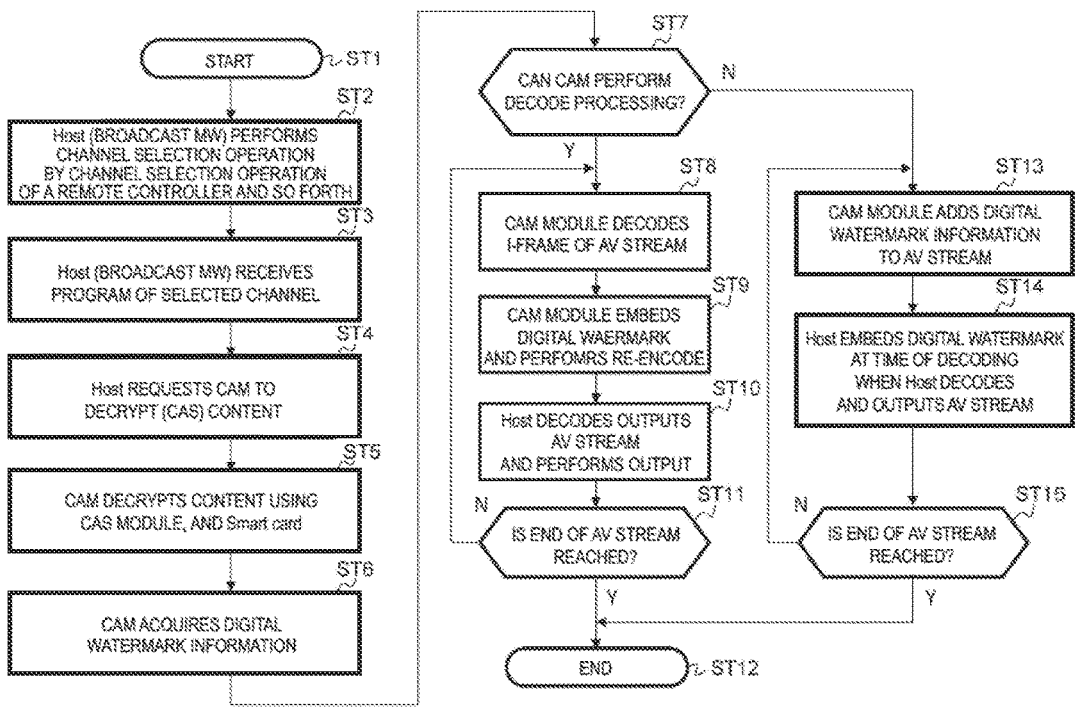
FIG. 4 is a flow chart showing one example of a processing procedure of a reception device (Host) and a CAM module in a case in which broadcast content is received.
Figure 5:
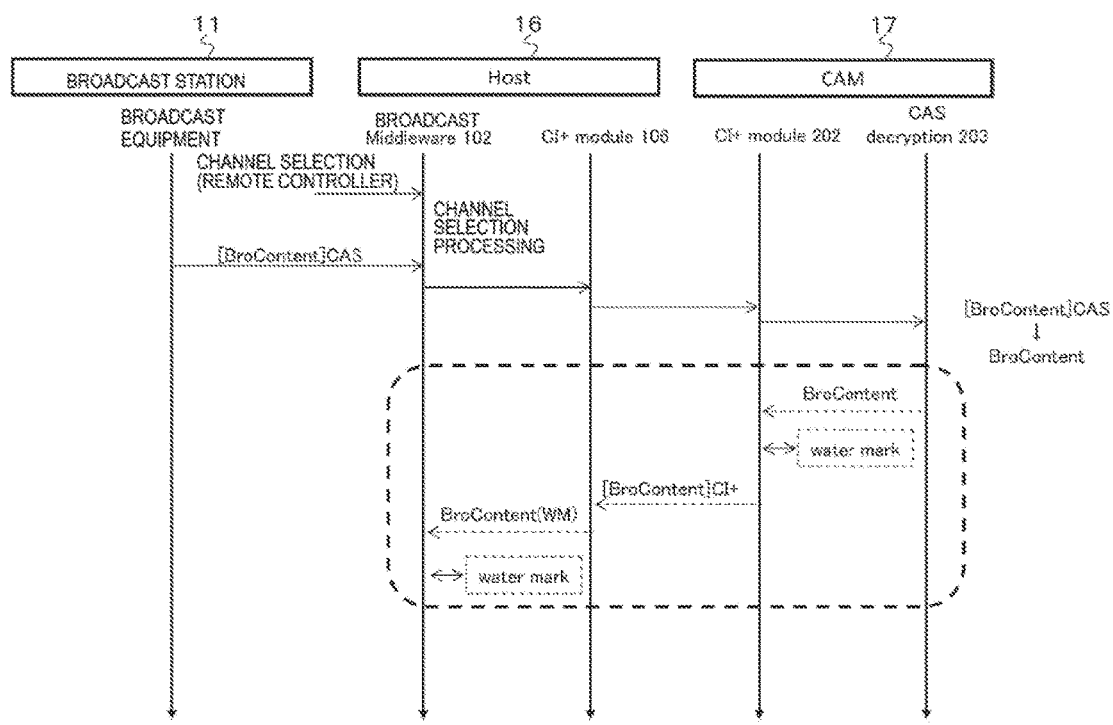
FIG. 5 is a sequence diagram showing an operation example of broadcast transmission equipment, a reception device (Host) and a CAM module in a case in which broadcast content is received.

A flow chart in FIG. 4 shows one example of a processing procedure of a reception device (Host) 16 and a CAM module 17 in a case in which broadcast content is received. In addition, a sequence diagram in FIG. 5 shows an operation example of broadcast transmission equipment 11, the reception device (Host) 16 and the CAM module 17 which correspond to that case.

In step ST1, the reception device (Host) 16 and the CAM module 17 start processing. Then, in step ST2, the reception device 16 (middleware 102) performs a channel selection operation by a channel selection processing of a remote controller and the like. Then, in step ST3, the reception device 16 receives a program of a selected channel from the broadcast transmission equipment 11.

Next, in step ST4, the reception device 16 requests the CAM module 17 to decrypt (CAS) content. Next, in step ST5, the CAM module 16 uses a CAS decryption (CAS module) 202 to decrypt content. Next, in step ST6, the CAM module 17 acquires information to create a digital watermark (digital watermark information).

Next, in step ST7, the CAM module 17 determines whether or not a decode processing is possible, that is to say, whether or not embedment of a digital watermark is possible. When the decode processing is possible (see the CAM module 17 in FIG. 2), the CAM module 17 proceeds to a processing in step ST8. In this step ST8, the CAM module 17 decodes an I-frame (intra-frame) of decrypted content (AV stream).

Next, in step ST9, the CAM module 17 embeds a digital watermark in that I-frame and re-encodes the I-frame. Next, in step ST10, the reception device 16 decodes and outputs the content (AV stream) decrypted by the CAM module 17. Then, in step ST11, the reception device 16 and the CAM module 17 determine whether or not the end of the content (AV stream) is reached. When the end of the content (AV stream) is not reached, the reception device 16 and the CAM module 17 return to the processing in step ST8 and repeat the processing similar to the above. On the one hand, when the end of the content (AV stream) is reached, the reception device 16 and the CAM module 17 end the processing in step ST12.

In addition, when the decode processing is impossible in step ST7 (see the CAM module 17 in FIG. 3), the CAM module 17 adds digital watermark information (information to create a digital watermark) to the decrypted content (AV stream) in step ST13. Then, in step ST14, the reception device 16 decodes and outputs the content (AV stream) decrypted by the CAM module 17. In this case, the reception device 16 uses the digital watermark information added to the content and embeds a digital watermark in the decoded content.

Then, in step ST15, the reception device 16 and the CAM module 17 determine whether or not the end of the content (AV stream) is reached. When the end of the content (AV stream) is not reached, the reception device 16 and the CAM module 17 return to the processing in step S13 and repeat the processing similar to the above. On the one hand, when the end of the content (AV stream) is reached, the reception device 16 and the CAM module 17 end the processing in step ST12.

Operation Example 2

Figure 6:
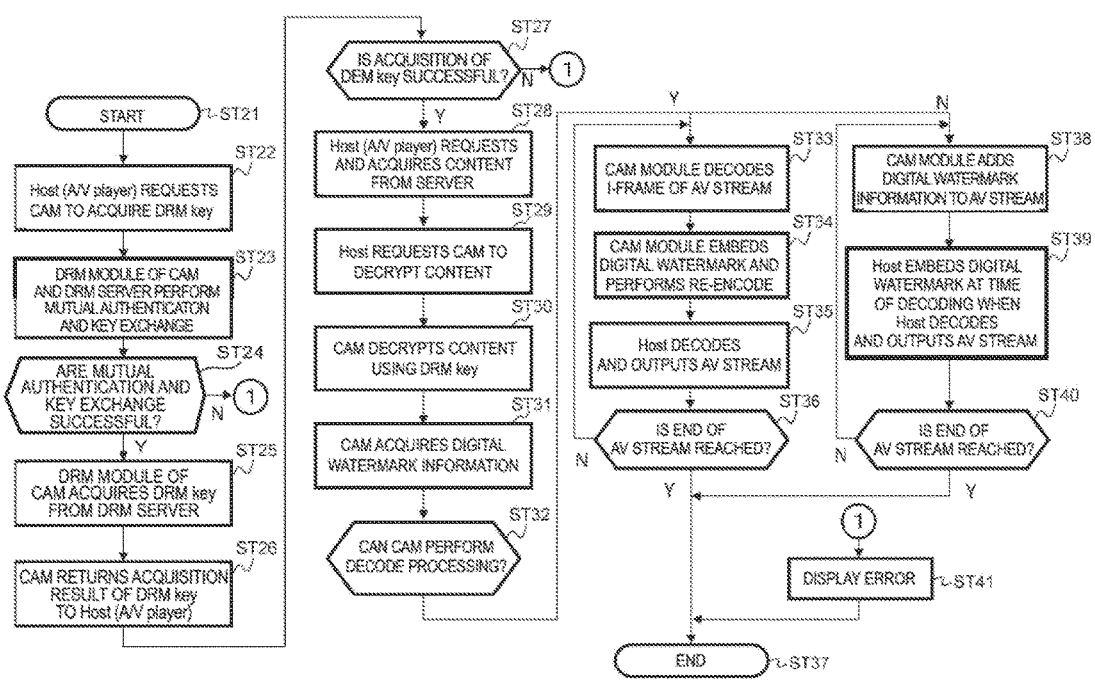
FIG. 6 is a flow chart showing one example of a processing procedure (an A/V player of a reception device is a main control entity) of a reception device (Host) and a CAM module in a case in which communication content is received.
Figure 7:
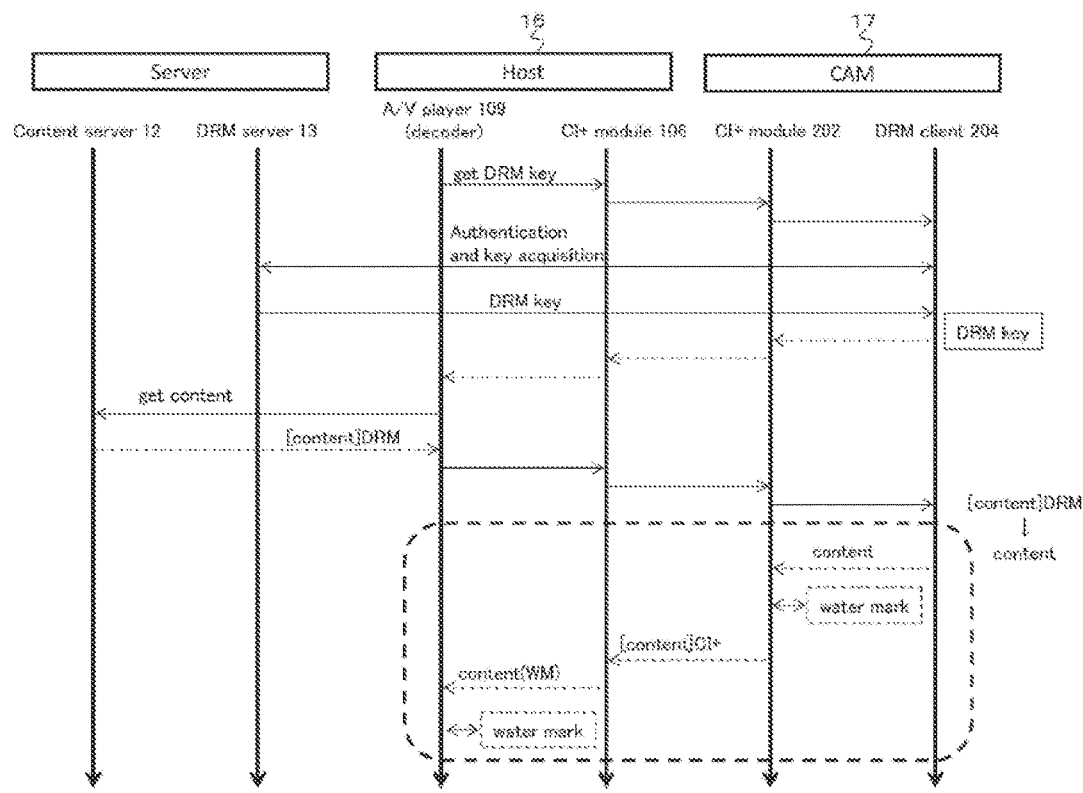
FIG. 7 is a sequence diagram showing an operation example of broadcast transmission equipment, a reception device (Host), and a CAM module in a case in which communication content is received.

A flow chart in FIG. 6 shows one example of a processing procedure of a reception device (Host) 16 and a CAM module 17 in a case in which communication content is received. In addition, a sequence diagram in FIG. 7 shows an operation example of broadcast transmission equipment 11, the reception device (Host) 16, and the CAM module 17 which correspond to that case. In this case, an A/V player 109 of the reception device 16 controls acquisition of a DRM key (DRM Key) and content.

In step ST21, the reception device (Host) 16 and the CA module 17 start processing. Next, in step ST22, the reception device 16 (A/V player 109) requests the CAM module 17 to acquire a DRM key. Then, in step ST23, a DRM client (DRM module) 204 of the CAM module 17 and a DRM server 13 perform mutual authentication and key exchange.

Next, in step ST24, the DRM client (DRM module) 204 of the CAM module 17 determines whether or not the mutual authentication and the key exchange are successful. When the mutual authentication and the key exchange are successful, the DRM client (DRM module) 204 acquires a DRM key from the DRM server 13 in step ST25. Then, in step ST26, the DRM client (DRM module) 204 returns an acquisition result of the DRM key to the reception device 16 (A/V player 109).

Next, in step ST27, the reception device 16 (A/V player 109) determines whether or not the acquisition of the DRM key is successful. When the acquisition of the DRM key is successful, the reception device 16 (A/V player 109) requests and acquires content from a content distribution server 12. Then, in step ST29, the reception device 16 (A/V player 109) requests the CAM module 17 to decrypt the content.

Next, in step ST30, the DRM client (DRM module) 204 of the CAM module 17 uses the DRM key to decrypt the content. Then, in step ST31, the CAM module 17 acquires information to create a digital watermark (digital watermark information).

Next, in step ST32, the CAM module 17 determines whether or not a decode processing is possible, that is to say, whether or not embedment of a digital watermark is possible. When the decode processing is possible (see the CAM module 17 in FIG. 2), the CAM module 17 proceeds to a processing in step S33. In this step ST33, the CAM module 17 decodes an I-frame (intra-frame) of the decrypted content (AV stream). Then, in step ST34, the CAM module 17 embeds a digital watermark in that I-frame and re-encodes the I-frame.

Next, in step ST35, the reception device 16 decodes and outputs the content (AV stream) decrypted by the CAM module 17. In this case, since the CAM module 17 has already embedded a digital watermark in the content, the reception device 16 does not embed a digital watermark.

Next, in step ST36, the reception device 16 and the CAM module 17 determine whether or not the end of the content (AV stream) is reached. When the end of the content (AV stream) is not reached, the reception device 16 and the CAM module 17 return to the processing in step ST33 and repeat the processing similar to the above. On the one hand, when the end of the content (AV stream) is reached, the reception device 16 and the CAM module 17 end the processing in step ST37.

In step ST32, when the decode processing is impossible (see the CAM module 17 in FIG. 3), the CAM module 17 adds digital watermark information (information to create a digital watermark) to the decrypted content (AV stream) in step ST38. Then, in step ST39, the reception device 16 decodes and outputs the content (AV stream) decrypted by the CAM module 17. In this case, the reception device 16 uses the digital watermark information added to the content and embeds a digital watermark in the decoded content.

Then, in step ST40, the reception device 16 and the CAM module 17 determine whether or not the end of the content (AV stream) is reached. When the end of the content (AV stream) is not reached, the reception device 16 and the CAM module 17 return to the processing in the step ST38 and repeat processing similar to the above. On the one hand, when the end of the content (AV stream) is reached, the reception device 16 and the CAM module 17 end the processing in step ST37.

In addition, when the mutual authentication and the key exchange are not successful in step ST24, or the acquisition of the DRM key is not successful in step ST27, the reception device 16 (A/V player 109) displays an error in step ST41. Then, in step ST37, the reception device 16 and the CAM module 17 end the processing.

Operation Example 3

Figure 8:
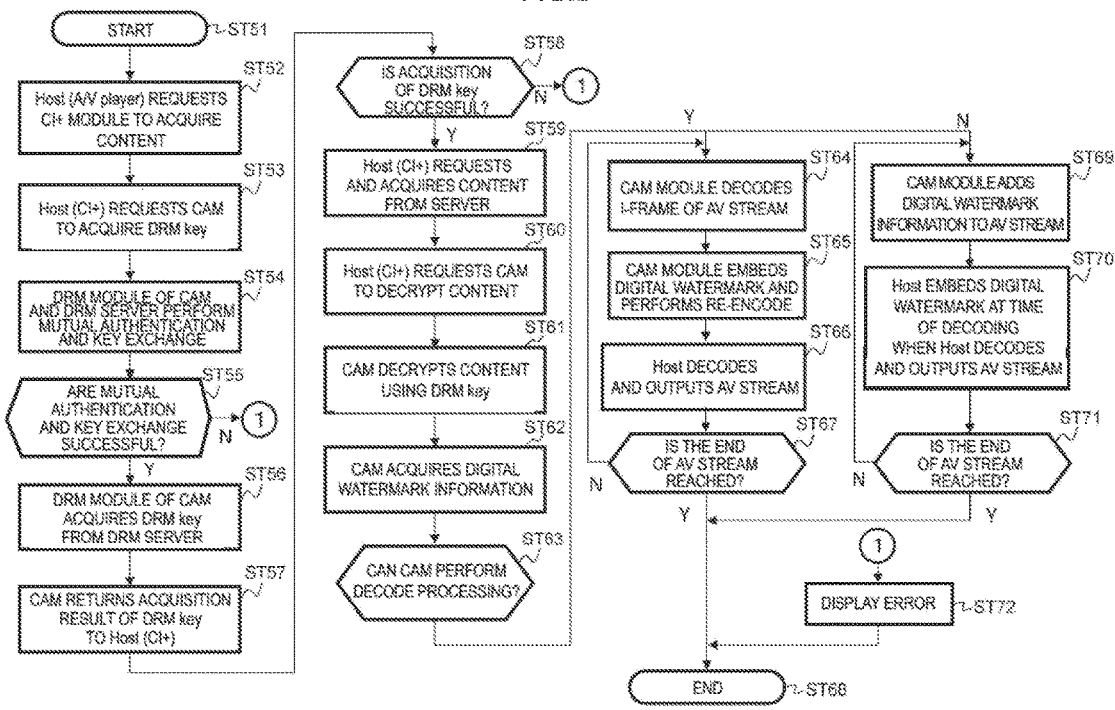
FIG. 8 is a flow chart showing one example of a processing procedure (a CI+ module of a reception device is a main control entity) of a reception device (Host) and a CAM module in a case in which communication content is received.
Figure 9:
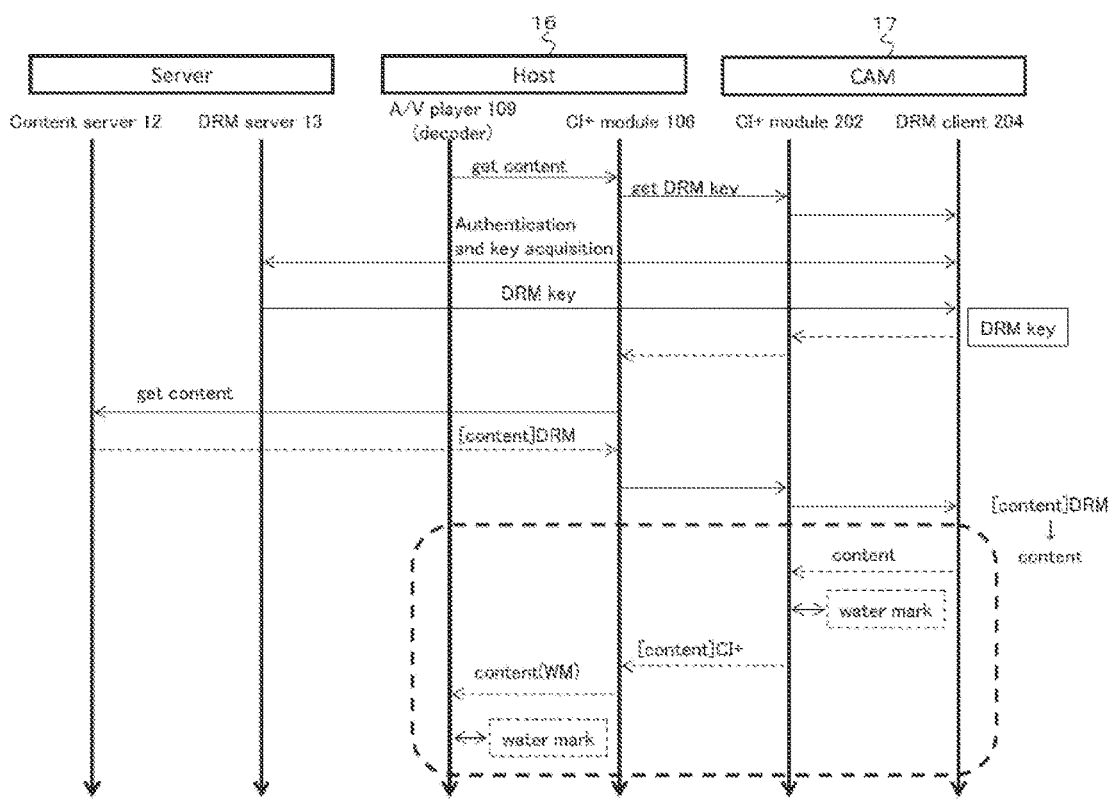
FIG. 9 is a sequence diagram showing an operation example of broadcast transmission equipment, a reception device (Host) and a CAM module in a case in which communication content is received.

A flow chart in FIG. 8 shows one example of a processing procedure of a reception device (Host) 16 and a CAM module 17 in a case in which communication content is received. In addition, a sequence diagram in FIG. 9 shows an operation example of broadcast transmission equipment 11, the reception device (Host) 16, and the CAM module 17 which correspond to that case. In this example, a CI+ module 106 of the reception device 16 controls acquisition of a DRM key (DRM Key) and content.

In step ST51, the reception device (Host) 16 and the CAM module 17 start processing. Next, in step ST52, the reception device 16 (A/V player 109) requests the CI+ module 106 to acquire content. In step ST53, this CI+ module 106 requests the CAM module 17 to acquire a DRM key. Then, in step ST54, a DRM client (DRM module) 204 of the CAM module 17 and a DRM server 13 perform mutual authentication and key exchange.

Next, in step ST55, the DRM client (DRM module) 204 of the CAM module 17 determines whether or not the mutual authentication and the key exchange are successful. When the mutual authentication and the key exchange are successful, the DRM client (DRM module) 204 acquires a DRM key from the DRM server 13 in step ST56. Then, in step ST57, the DRM client (DRM module) 204 returns an acquisition result of the DRM key to the reception device 16 (CI+ module 106).

Next, in step ST58, the reception device 16 (CI+ module 106) determines whether or not the acquisition of the DR key is successful. When the acquisition of the DR key is successful, the reception device 16 (CI+ module 106) requests and acquires content from a content distribution server 12 in step ST59. Then, in step ST60, the reception device 16 (CI+ module 106) requests the CAM module 17 to decrypt the content.

Next, in step ST61, the DRM client (DRM module) 204 of the CAM module 17 uses the DRM key to decrypt the content. Then, in step ST62, the CAM module 17 acquires information to create a digital watermark (digital watermark information).

Next, in step ST63, the CAM module 17 determines whether or not a decode processing is possible, that is to say, whether or not embedment of a digital watermark is possible. When the decode processing is possible (see the CAM module 17 in FIG. 2), the CAM module 17 proceeds to a processing in step S64. In this step ST64, the CAM module 17 decodes an I-frame of the decrypted content (AV stream). Then, in step ST65, the CAM module 17 embeds a digital watermark in that I-frame and re-encodes the I-frame.

Next, in step ST66, the reception device 16 decodes and outputs the content (AV stream) decrypted by the CAM module 17. In this case, since the CAM module 17 has already embedded a digital watermark in the content, the reception device (Host) 16 does not embed a digital watermark.

Next, in step ST67, the reception device 16 and the CAM module 17 determine whether or not the end of the content (AV stream) is reached. When the end of the content (AV stream) is not reached, the reception device 16 and the CAM module 17 return to the processing in step S64 and repeat the processing similar to the above. On the one hand, when the end of the content (AV stream) is reached, the reception device 16 and the CAM module 17 end the processing in step ST68.

In addition, in step ST63, when the decode processing is impossible (see the CAM module 17 in FIG. 3), the CAM module 17 adds digital watermark information (information to create a digital watermark) to the decrypted content (AV stream) in step ST69.

Next, in step ST70, the reception device 16 decodes and outputs the content (AV stream) decrypted by the CAM module 17. In this case, the reception device 16 uses the digital watermark information added to the content and embeds a digital watermark in the decoded content.

Then, in step ST71, the reception device 16 and the CAM module 17 determine whether or not the end of the content (AV stream) is reached. When the end of the content (AV stream) is not reached, the reception device 16 and the CAM module 17 return to the processing in step ST69 and repeat the processing similar to the above. On the one hand, when the end of the content (AV stream) is reached, the reception device 16 and the CAM module 17 end the processing in step ST68.

In addition, when the mutual authentication and the key exchange are not successful in step ST55, or when the acquisition of the DRM key is not successful in step ST58, the reception device 16 (CI+ module 106) displays an error in step ST72. Then, the reception device 16 and the CAM module 17 end the processing in step ST68.

Operation Example 4

Figure 10:
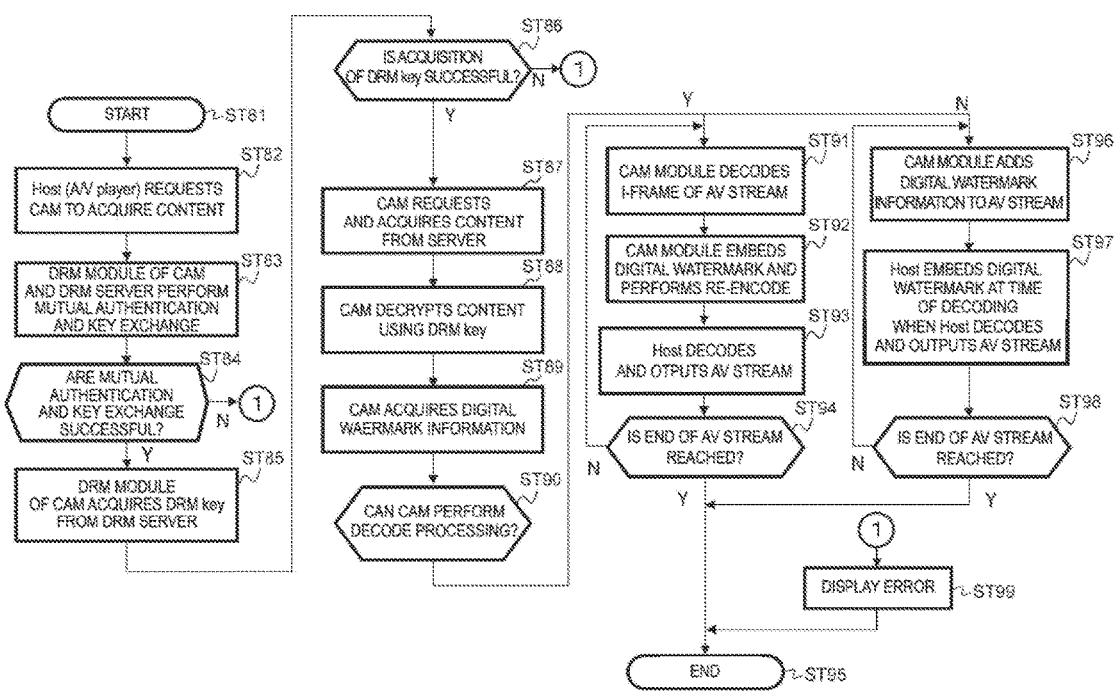
FIG. 10 is a flow chart showing one example of a processing procedure (a DRM client of a CAM module is a main control entity) of a reception device (Host) and a CAM module in a case in which communication content is received.
Figure 11:
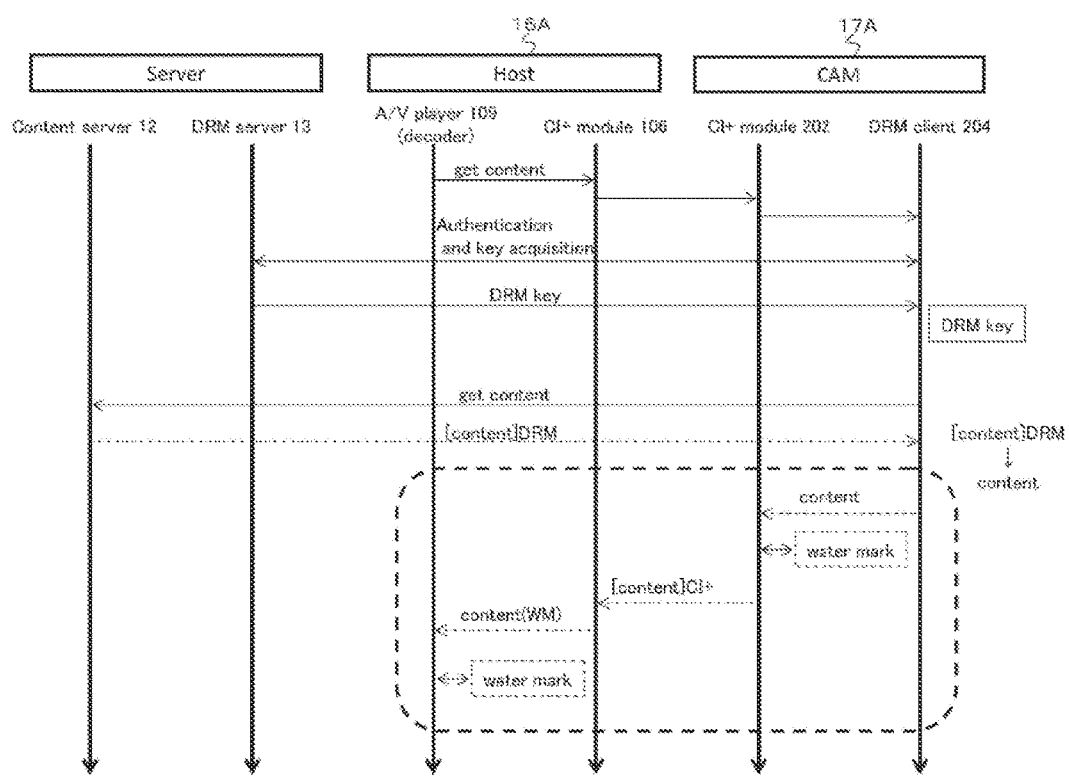
FIG. 11 is a sequence diagram showing an operation example of broadcast transmission equipment, a reception device (Host) and a CAM module in a case in which communication content is received.

A flow chart in FIG. 10 shows one example of a processing procedure of a reception device 16A and a CAM module 17A in a case in which communication content is received. In addition, a sequence diagram in FIG. 11 shows an operation example of broadcast transmission equipment 11, the reception device 16A and the CAM module 17A which correspond to that case. In this example, the CAM module 17 controls acquisition of a DRM key (DRM Key) and content.

Figure 12:
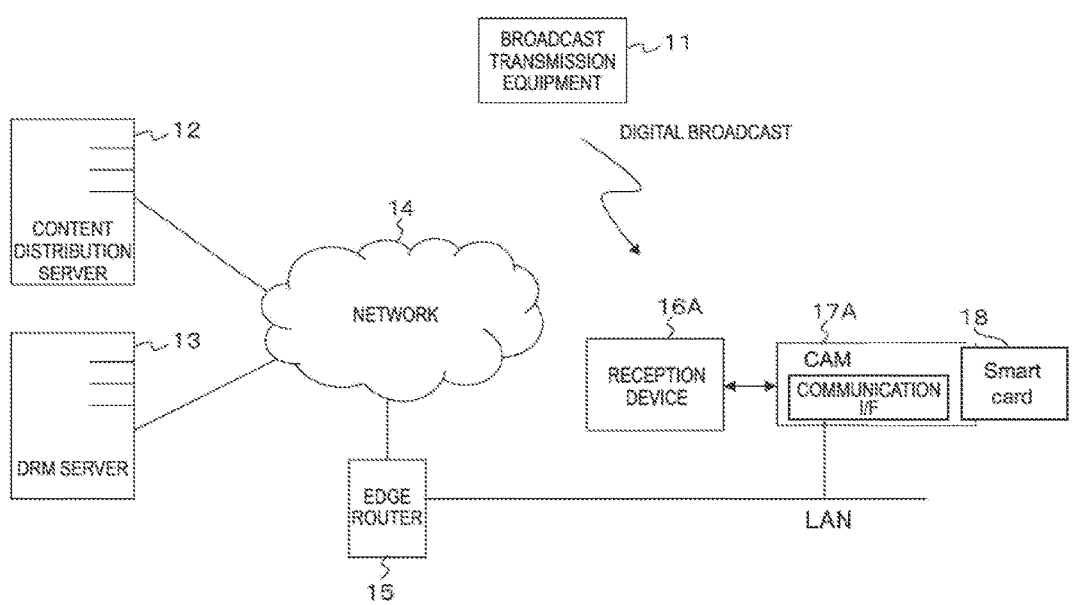
FIG. 12 is a block diagram showing other configuration example of a content transmission and reception system.
Figure 13:
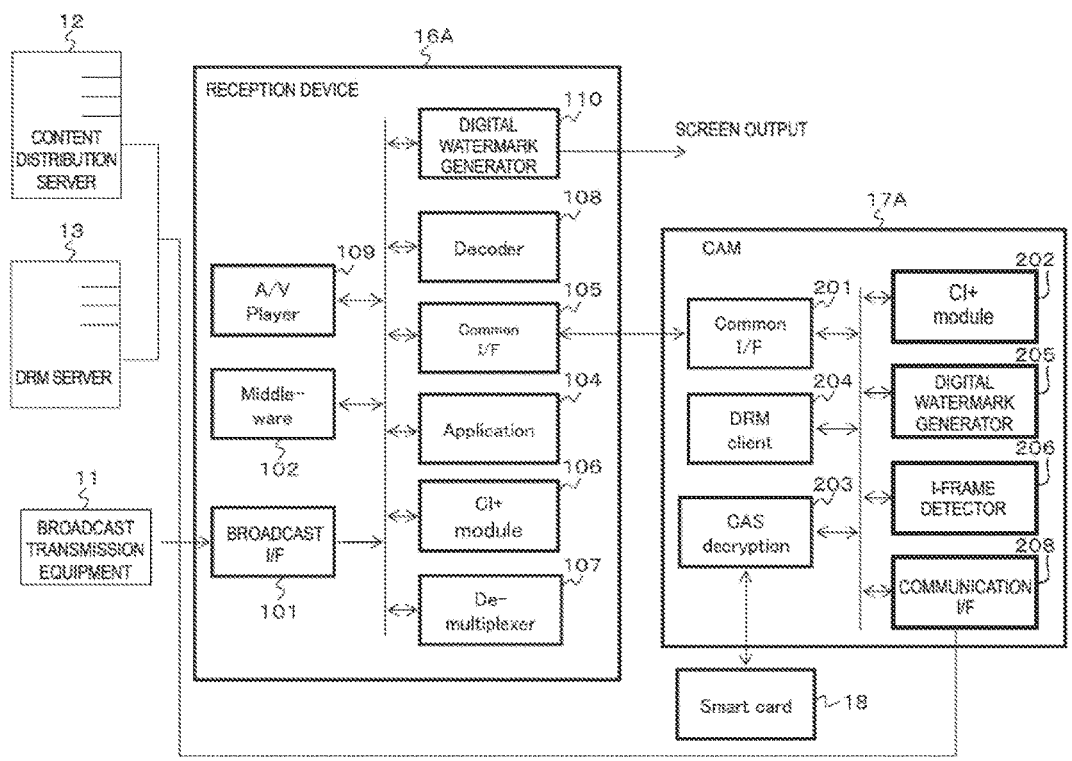
FIG. 13 is a block diagram showing other configuration example of a reception device and a CAM module.
Figure 14:
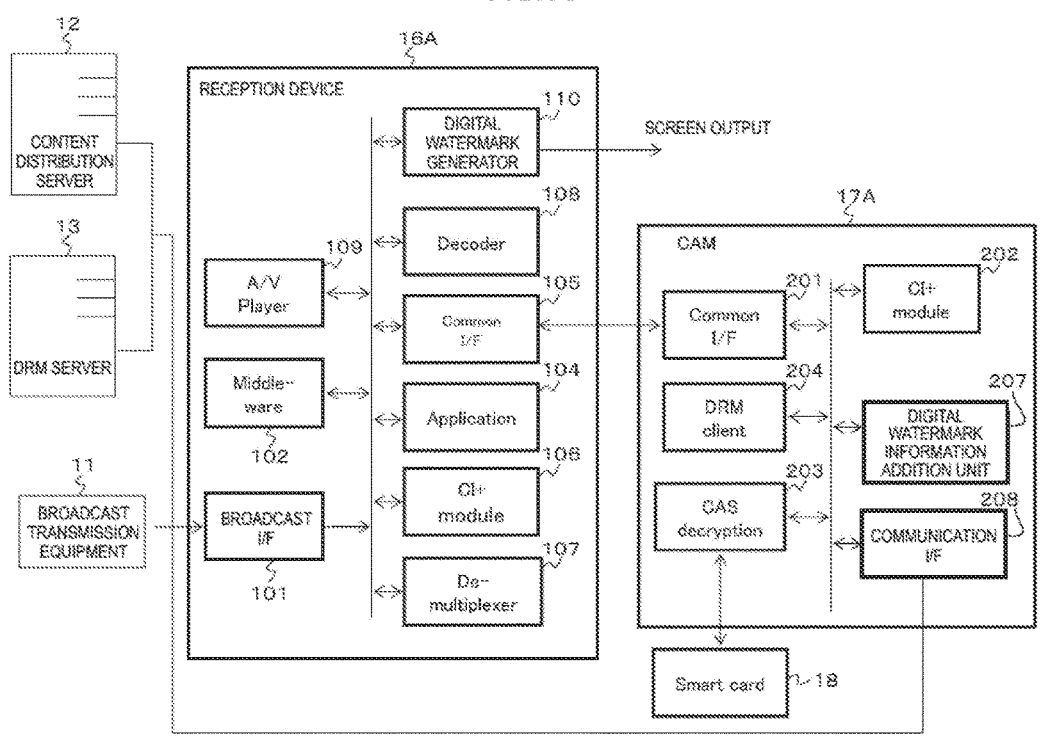
FIG. 14 is a block diagram showing other configuration example of a reception device and a CAM module.

FIG. 12 shows a configuration example of a content transmission and reception system 10A in this example. In this FIG. 12, same symbols are assigned to parts corresponding to FIG. 1, a detailed description of which is omitted. As shown in FIG. 13 and FIG. 14, the reception device 16A is configured similar to the reception device 16 (see FIG. 2 and FIG. 3) in the content transmission and reception system 10 in FIG. 1, except that the reception device 16A does not have a communication interface which communicates with a content distribution server 12 and a DRM server 13.

In addition, as shown in FIG. 13 and FIG. 14, the CAM module 17A is configured similar to the CAM module 17 (see FIG. 2 and FIG. 3) in the content transmission and reception system 10 in FIG. 1, except that the CAM module 17A has a communication interface 208 which communicates with the content distribution server 12 and the DRM server 13.

In step ST81, the reception device (Host) 16A and the CAM module 17A start processing. Next, in step ST82, the reception device 16A (A/V player 109) requests the CAM module 17A to acquire content. Next, in step ST83, a DRM client (DRM module) 204 of the CAM module 17A and a DRM server 13 perform mutual authentication and key exchange in step ST83. In this case, the DRM client (DRM module) 204 of the CAM module 17A directly communicates with the DRM server 13 through the communication interface 208.

Next, in step ST84, the DRM client (DRM module) 204 of the CAM module 17A determines whether or not the mutual authentication and the key exchange are successful. When the mutual authentication and the key exchange are successful, the DRM client (DRM module) 204 acquires a DRM key from the DRM server 13 in step ST85. Also in this case, the DRM client (DRM module) 204 directly communicates with the DRM server 13 through the communication interface 208.

Next, in step ST86, the DRM client (DRM module) 204 of the CAM module 17A determines whether or not the acquisition of the DRM key is successful. When the acquisition of the DRM key is successful, the DRM client (DRM module) 204 requests and acquires content from the content distribution server 12 in step ST87. Also in this case, the DRM client (DRM module) 204 directly communicates with the DRM server 13 through the communication interface 208.

Next, in step ST88, the DRM client (DRM module) 204 uses the DRM key to decrypt the content. Next, in step ST89, the CAM module 17A acquires information to create a digital watermark (digital watermark information).

Next, in step ST90, the CAM module 17A determines whether or not a decode processing is possible, that is to say, whether or not embedment of a digital watermark is possible. When the decode processing is possible (see the CAM module 17A n FIG. 12), the CAM module 17A proceeds to a processing in step ST91. In this step ST91, the CAM module 17A decodes an I-frame of the decrypted content (AV stream). Then, in step ST92, the CAM module 17A embeds a digital watermark in that I-frame and re-encodes the I-frame.

Next, in step ST93, the reception device 16A decodes and outputs the content (AV stream) decrypted by the CAM module 17A. In this case, since the CAM module 17 has already embedded a digital watermark in the content, the reception device 16A does not embed a digital watermark.

Next, in step ST94, the reception device 16A and the CAM module 17A determine whether or not the end of the content (AV stream) is reached. When the end of the content (AV stream) is not reached, the reception device 16A and the CAM module 17A return to the processing in step ST91, and repeat the processing similar to the above. On the one hand, when the end of the content (AV stream) is reached, the reception device 16A and the CAM module 17A end the processing in step ST95.

In addition, when the decode processing is impossible in step ST90 (see the CAM module 17A in FIG. 14), the CAM module 17A adds digital watermark information (information to create a digital watermark) to the decrypted content (AV stream) in step ST96.

Next, in step ST97, the reception device 16A decodes and outputs the content (AV stream) decrypted by the CAM module 17A. In this case, the reception device 16A uses the digital watermark information added to the content and embeds a digital watermark in the decoded content.

Then, in step ST98, the reception device 16A and the CAM module 17A determine whether the end of the content (AV stream) is reached. When the end of the content (AV stream) is not reached, the reception device 16A and the CAM module 17A return to the processing in step ST96 and repeat processing similar to the above. On the one hand, when the end of the content (AV stream) is reached, the reception device 16A and the CAM module 17A end the processing in step ST95.

In addition, when the mutual authentication and the key exchange are not successful in step ST84, or when the acquisition of the DRM key is not successful in step ST86, the reception device 16 (CI+ module 106) displays an error in step ST99. Then, the reception device 16A and the CAM module 17A end the processing in step ST95.

As described above, in the content transmission and reception system 10, 10A as shown in FIG. 1 or FIG. 12, a digital watermark is embedded in content decoded and outputted by the reception device 16, 16A by use of information specifying an outflow route for that content. Thus, it becomes possible to specify the outflow route if the content is used in an unauthorized manner. In addition, the effect of deterrence to obviate illicit outflow of content can also be expected.

In addition, the content transmission and reception system 10, 10A as shown in FIG. 1 or FIG. 12 can handle both broadcast content and communication content in an integrated manner. In addition, in the content transmission and reception system 10, 10A as shown in FIG. 1 or FIG. 12, digital watermark information is treated within the CAM module 17, 17A in which other content protection features have been consolidated, and thus, a new protection feature can be implemented, while robustness of the conventional content protection is maintained.

2. Modifications

Note that in the embodiments described above, the CAM module 17, 17A connected to the reception device 16, 16A through the common interface decrypts broadcast content and communication content. However, it is needless to say that the present technology can similarly apply to any reception device in which these reception device and CAM module are integrated.

In addition, in the embodiments described above, it was described that when the CAM module 17, 17A adds digital watermark information to content, the digital watermark information is embedded in an SEI field or an adaptation field of MPEG2TS. However, a location where digital watermark information is embedded is not limited to the SEI field or the adaptation field of MPEG2TS.

In addition, in the embodiments described above, it was shown that the reception device 16, 16A not only receives broadcast content from the broadcast transmission equipment 11, but also receives communication content from the content distribution server 12 connected to the network 14 and processes the communication content. However, the present disclosure can similarly apply to a reception device which receives and processes either broadcast content or communication content.

In addition, in the embodiments described above, the reception device 16, 16A or the CAM module 17, 17A embeds a digital watermark in content. However, it is also possible that the broadcast transmission equipment 11 or the content distribution server 12 embeds a digital watermark in content and delivers the content. For example, if the content distribution server 12 embeds a digital watermark in communication content, the content distribution server 12 delivers the content as per a request of a reception device. Thus, as digital watermark information, information identifying a reception device or a CAM module ("Host ID, "CICAM ID" and the like) can be easily included, in addition to information identifying a transmission source ("content server ID" and the like).

Additionally, the present technology may also be configured as below.

(1)

A reception device including:

a content reception unit configured to receive content;

a digital watermark information acquisition unit configured to acquire information specifying an outflow route for the content to create a digital watermark; and a content output unit configured to embed a digital watermark in the received content by using the acquired information and configured to output the content.

(2)

The reception device according to (1), wherein the content reception unit receives the content from a digital broadcast system and/or a distribution server on a network.

(3)

The reception device according to (1) or (2), wherein the information to create a digital watermark includes at least information identifying a transmission source of the content and information identifying an own device.

(4)

The reception device according to any one of (1) to (3), wherein when the information to be used to create a digital watermark is added to the received content, the digital watermark information acquisition unit further acquires the information.

(5)

A reception method including:

a step of receiving content;

a step of acquiring information specifying an outflow route for the content to create a digital watermark; and a step of embedding a digital watermark in the received content and outputting the content by using the acquired information.

(6)

A program causing a computer to function as:

content reception means for receiving content;

digital watermark information acquisition means for acquiring information specifying an outflow route for the content to create a digital watermark; and output means for embedding a digital watermark in the decrypted content and outputting the content by using the acquired information.

(7)

A reception device including:

a content reception unit configured to receive encrypted content;

an interface unit configured to transmit the received content to external equipment and configured to receive decrypted content from the external equipment; and a content output unit configured to embed, by using information specifying an outflow route for the content to create a digital watermark, a digital watermark in the content received from the external equipment and configured to output the content.

(8)

The reception device according to (7), wherein the content output unit uses the information to create the digital watermark which is added to the content received from the external equipment.

(9)

The reception device according to (7) or (8), wherein when determining that a digital watermark has already been embedded in the content received from the external equipment, the content output unit does not embed a digital watermark in the content received from the external equipment.

(10)

The reception device according to (9), wherein the interface unit further receives functional information of the external equipment from the external equipment, and wherein the content output unit determines, based on the received functional information, whether or not the digital watermark has been embedded in the content received from the external equipment.

(11)
The reception device according to any one of (7) to (10), wherein the information to create a digital watermark includes at least information identifying a transmission source of the content, information identifying an own device, and information identifying the external equipment.

(12)
A decryption processing device including:
an interface unit configured to receive encrypted content from external equipment and configured to transmit decrypted content to the external equipment;
a decryption unit configured to perform a decryption processing on the encrypted content to acquire the decrypted content; and
a digital watermark embedment unit configured to embed a digital watermark in the content to be transmitted by using information specifying an outflow route for the content to create a digital watermark.

(13)
The decryption processing unit according to (12), wherein the content includes video data for each inter-frame predictive encoded frame, and
wherein the digital watermark embedment unit embeds a digital watermark in video data of an intra-frame.

(14)
The decryption processing device according to (12) or (13),
wherein the information to create a digital watermark includes at least information identifying a transmission source of the content, information identifying the external equipment, and information identifying an own device.

(15)
A decryption processing device including:
an interface unit configured to receive encrypted content from external equipment and configured to transmit decrypted content to the external equipment;
a decryption unit configured to perform a decryption processing on the encrypted content to acquire the decrypted content; and
a digital watermark information addition unit configured to add, to the content to be transmitted, information specifying an outflow route for the content to create a digital watermark.

(16)
The decryption processing device according to (15), wherein the information to create the digital watermark includes at least information identifying a transmission source of the content, information identifying the external equipment, and information identifying an own device.

(17)
A reception processing system including:
a reception device; and
a decryption processing device,
wherein the reception device includes
a content reception unit configured to receive encrypted content,
an interface unit configured to transmit the received content to the decryption processing device and configured to receive decrypted content from the decryption processing device, and
a content output unit configured to embed a digital watermark in the content received from the decryption processing device and output the content by using information specifying an outflow route for the content to create a digital watermark which is added to the content, and
wherein the decryption processing device includes
an interface unit configured to receive the encrypted content from the reception device and configured to transmit the decrypted content to the reception device,
a decryption unit configured to perform a decryption processing on the encrypted content to acquire the decrypted content, and
a digital watermark information addition unit configured to add the information to create the digital watermark to the content to be transmitted.

(18)
A reception processing system including:
a reception device; and
a decryption processing device,
wherein the reception device includes
a content reception unit configured to receive encrypted content,
an interface unit configured to transmit the received content to the decryption processing device and configured to receive decrypted content from the decryption processing device, and
a content output unit configured to output the received content, and
wherein the decryption processing device includes
an interface unit configured to receive the encrypted content from the reception device and transmit the decrypted content to the reception device,
a decryption unit configured to perform a decryption processing on the encrypted content to acquire the decrypted content, and
a digital watermark embedment unit configured to embed a digital watermark in the content to be transmitted, by using information specifying an outflow route for the content to create a digital watermark.

(19)
An information processing device including:
a content acquisition unit configured to acquire content;
a digital watermark information acquisition unit configured to acquire information specifying an outflow route for the content to create a digital watermark; and
a content output unit configured to embed a digital watermark in the acquired content and output the content, by using the acquired information.

REFERENCE SIGNS LIST 10, 10A content transmission and reception system
11 broadcast transmission equipment
12 content distribution server
13 DRM server
14 network
15 edge router
16, 16A reception device
17, 17A CAM module
18 smart card
101 broadcast interface
102 middleware
103 communication interface
104 application
105 common interface
106 CI+ module
107 demultiplexer
108 decoder
109 A/V player
110 digital watermark generator
201 common interface
202 CI+ module
203 CAS decryption 204 DRM client
205 digital watermark generator
206 I-frame detector
207 digital watermark information addition unit
208 communication interface

The invention claimed is:

1. A reception device comprising:
a content reception unit configured to receive content;
a digital watermark information acquisition unit configured to acquire information specifying an output for the content to create a digital watermark; and
a content output unit configured to embed the digital watermark in the received content by using the acquired information and configured to output the content,
the information to create the digital watermark includes at least (i) source information which identifies a transmission source of the content and (ii) device information which identifies the reception device, and
the embedded digital watermark identifies the transmission source and the reception device which provides an indication of the output for the content,
wherein an authentication certificate of the reception device comprises a value indicating that the reception device is operable to perform a watermark embedding function in the case of the reception device is operable to perform a watermark embedding function, and comprises a value indicating that the reception device is not operable to perform a watermark embedding function in the case of the reception device is not operable to perform a watermark embedding function.

2. The reception device according to claim 1, wherein the content reception unit receives the content from at least one of a digital broadcast system or a distribution server on a network.

3. The reception device according to claim 1, wherein if the information to be used to create a digital watermark is added to the received content, the digital watermark information acquisition unit further acquires the information.

4. The reception device according to claim 1, wherein the content output unit is configured to embed the digital watermark in a video encoded content of the received content.

5. The reception device according to claim 4, wherein the content output unit is configured to embed the digital watermark in intra-frames of the video encoded content.

6. The reception device according to claim 4, wherein the content output unit is configured to embed the digital watermark in intra-frames and inter-frames of the video encoded content.

7. A reception method for use by a reception device, said method comprising:
receiving content;
acquiring information specifying an output for the content to create a digital watermark; and
embedding the digital watermark in the received content by using the acquired information and outputting the content,
the information to create the digital watermark includes at least (i) source information which identifies a transmission source of the content and (ii) device information which identifies the reception device, and
the embedded digital watermark identifies the transmission source and the reception device which provides an indication of the output for the content,
wherein an authentication certificate of the reception device comprises a value indicating that the reception device is operable to perform a watermark embedding function in the case of the reception device is operable to perform a watermark embedding function, and comprises a value indicating that the reception device is not operable to perform a watermark embedding function in the case of the reception device is not operable to perform a watermark embedding function.

8. A reception device comprising:
a content reception unit configured to receive encrypted content;
an interface configured to transmit the received content to a conditional access module and configured to receive decrypted content from the conditional access module; and
a content output unit configured to embed, by using information specifying an output for the content to create a digital watermark, the digital watermark in the content received from the conditional access module and configured to output the content,
the information to create the digital watermark includes at least (i) source information which identifies a transmission source of the content and (ii) device information which identifies the reception device, and
the embedded digital watermark identifies the transmission source and the reception device which provides an indication of the output for the content,
wherein an authentication certificate of the reception device comprises a value indicating that the reception device is operable to perform a watermark embedding function in the case of the reception device is operable to perform a watermark embedding function, and comprises a value indicating that the reception device is not operable to perform a watermark embedding function in the case of the reception device is not operable to perform a watermark embedding function.

9. The reception device according to claim 8, wherein the content output unit uses the information to create the digital watermark which is added to the content received from the conditional access module.

10. The reception device according to claim 8, wherein if it is determined that the digital watermark has already been embedded in the content received from the conditional access module, the content output unit does not embed the digital watermark in the content received from the conditional access module.

11. The reception device according to claim 10,
wherein the interface further receives functional information of the conditional access module from the conditional access module, and
wherein the content output unit determines, based on the received functional information, whether or not the digital watermark has been embedded in the content received from the conditional access module.

12. The reception device according to claim 8,
wherein the information to create the digital watermark further includes information identifying the conditional access module.

13. A decryption processing device comprising:
an interface configured to receive encrypted content from a reception device and configured to transmit decrypted content to the reception device;
a decryption unit configured to perform a decryption processing on the encrypted content to acquire the decrypted content; and
a digital watermark embedment unit configured to embed a digital watermark in the content to be transmitted by using information specifying an output for the content to create the digital watermark, the information to create the digital watermark includes at least (i) source information which identifies a transmission source of the content and (ii) device information which identifies the decryption processing device, and the embedded digital watermark identifies the transmission source and the decryption processing device which provides an indication of the output for the content, wherein an authentication certificate of the decryption processing device comprises a value indicating that the decryption processing device is operable to perform a watermark embedding function in the case of the decryption processing device is operable to perform a watermark embedding function, and comprises a value indicating that the decryption processing device is not operable to perform a watermark embedding function in the case of the decryption processing device is not operable to perform a watermark embedding function.

14. The decryption processing unit according to claim 13, wherein the content includes video data for each inter-frame predictive encoded frame, and wherein the digital watermark embedment unit embeds a digital watermark in video data of an intra-frame.

15. The decryption processing device according to claim 13, wherein the information to create the digital watermark further includes information identifying the reception device, and wherein the embedded digital watermark also identifies the reception device.

16. A decryption processing device comprising:

an interface configured to receive encrypted content from a reception device and configured to transmit decrypted content to the reception device;

a decryption unit configured to perform a decryption processing on the encrypted content to acquire the decrypted content; and a digital watermark information addition unit configured to add, to the content to be transmitted, information specifying an output for the content to create a digital watermark, the information to create the digital watermark includes at least (i) source information which identifies a transmission source of the content and (ii) device information which identifies the decryption processing device, and the embedded digital watermark identifies the transmission source and the decryption processing device which provides an indication of the output for the content, wherein an authentication certificate of the decryption processing device comprises a value indicating that the decryption processing device is operable to add digital watermark information to the content to be transmitted in the case of the decryption processing device is operable to add digital watermark information to the content to be transmitted, and comprises a value indicating that the decryption processing device is not operable to add digital watermark information to the content to be transmitted in the case of the decryption processing device is not operable to add digital watermark information to the content to be transmitted.

17. The decryption processing device according to claim 16, wherein the information to create the digital watermark further includes information identifying the reception device, and wherein the embedded digital watermark also identifies the reception device.

18. An information processing device comprising:

a content acquisition unit configured to acquire content;

a digital watermark information acquisition unit configured to acquire information specifying an output for the content to create a digital watermark; and a content output unit configured to embed the digital watermark in the acquired content by using the acquired information and output the content, the information to create the digital watermark includes at least (i) source information which identifies a transmission source of the content and (ii) device information which identifies the information processing device, and the embedded digital watermark identifies the transmission source and the reception device which provides an indication of the output for the content, wherein an authentication certificate of the information processing device comprises a value indicating that the information processing device is operable to perform a watermark embedding function in the case of the information processing device is operable to perform a watermark embedding function, and comprises a value indicating that the information processing device is not operable to perform a watermark embedding function in the case of the information processing device is not operable to perform a watermark embedding function.

19. A television receiver comprising:

a content reception unit configured to receive content;

a digital watermark information acquisition unit configured to acquire information specifying an output for the content to create a digital watermark; and a content output unit configured to embed the digital watermark in the received content by using the acquired information and configured to output the content, the information to create the digital watermark includes at least (i) source information which identifies a transmission source of the content and (ii) device information which identifies the reception device, and the embedded digital watermark identifies the transmission source and the reception device which provides an indication of the output for the content, wherein an authentication certificate of the television receiver comprises a value indicating that the television receiver is operable to perform a watermark embedding function in the case of the television receiver is operable to perform a watermark embedding function, and comprises a value indicating that the television receiver is not operable to perform a watermark embedding function in the case of the television receiver is not operable to perform a watermark embedding function.

20. A television receiver comprising:

an interface to receive content;

a memory having a program stored therein; and a processing device to execute the program stored in the memory and upon execution thereof to cause information specifying an output for the content to create a digital watermark to be acquired, cause the digital watermark to be embedded in the received content by using the acquired information, and cause the content to be outputted, the information to create the digital watermark includes at least (i) source information which identifies a transmission source of the content and (ii) device information which identifies the television receiver, and the embedded digital watermark identifies the transmission source and the television receiver which provides an indication of the output for the content, wherein an authentication certificate of the television receiver comprises a value indicating that the television receiver is operable to perform a watermark embedding function in the case of the television receiver is operable to perform a watermark embedding function, and comprises a value indicating that the television receiver is not operable to perform a watermark embedding function in the case of the television receiver is not operable to perform a watermark embedding function.

\* \* \* \* \*

UNITED STATES PATENT AND TRADEMARK OFFICE
CERTIFICATE OF CORRECTION

PATENT NO. : 10,044,508 B2
APPLICATION NO. : 14/385306
DATED : August 7, 2018
INVENTOR(S) : Jun Kitahara and Kazutoyo Sekine Page 1 of 1

It is certified that error appears in the above-identified patent and that said Letters Patent is hereby corrected as shown below:

Column 23, Line 21 "unit" should read --device--

Signed and Sealed this
Ninth Day of October, 2018

Andrei Iancu
*Director of the United States Patent and Trademark Office*